United States Patent

Packard et al.

[11] 3,913,199
[45] Oct. 21, 1975

[54] RING MANUFACTURE, PRODUCTIVE OF FACE CONTACT SEAL

[75] Inventors: Norman M. Packard, Des Plaines; John W. Gaines, Wheaton, both of Ill.

[73] Assignee: International Harvester Company, Chicago, Ill.

[22] Filed: June 24, 1974

[21] Appl. No.: 482,309

[52] U.S. Cl. .................. 29/156.6; 51/290; 51/324
[51] Int. Cl.² ........................................ B23P 15/06
[58] Field of Search ..... 29/156.4 R, 156.5 R, 156.6, 29/156.63, 428, 407, 222; 73/119 R, 120; 51/290, 324, 326, 327, DIG. 6; 277/103, 216

[56] References Cited
UNITED STATES PATENTS

| | | | |
|---|---|---|---|
| 2,401,279 | 5/1946 | Thorndike | 51/324 X |
| 2,654,977 | 10/1953 | Squibb et al. | 29/156.6 X |
| 2,929,174 | 3/1960 | Aumiller | 51/290 X |
| 3,073,689 | 1/1963 | Kupfert et al. | 51/324 |
| 3,337,938 | 8/1967 | Prasse | 29/156.6 |
| 3,587,155 | 6/1971 | Packard | 29/156.6 |
| 3,762,107 | 10/1973 | Sullivan | 51/290 |

Primary Examiner—C. W. Lanham
Assistant Examiner—Joseph A. Walkowski
Attorney, Agent, or Firm—John W. Gaines; Floyd B. Harman

[57] ABSTRACT

Methods, apparatus, and improved structure having as their common basis the sequence of collapsing a piston ring in a fixture approximating engine bore diameter, and separately lapping a major portion of the ring side and a remaining locality —narrow in width, of band size and preferably line size— of the side of the ring while it is so collapsed, until circumferentially continuous portions of the side are flat in the range of at least about ten to five light bands. That is, out-of-flatness of the two circumferentially continuous portions, stated another way, is limited in each case to a range equivalent to about five to ten light bands at maximum, at standard inspection wave length. The broadest method disclosed is the use exclusively of rings so carefully made and so lap inspected as above on a percentage basis that the major portion of the side has all points thereon in coplanarity and the remaining locality has all points thereon in coplanarity, all to a degree equivalent to the stated range to seal in respective full face contact and at least full line contact.

5 Claims, 14 Drawing Figures

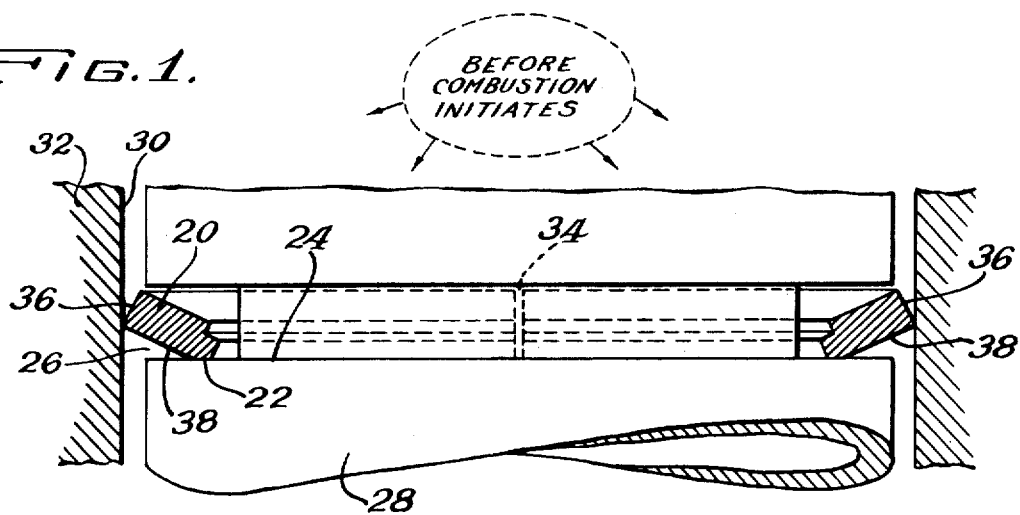
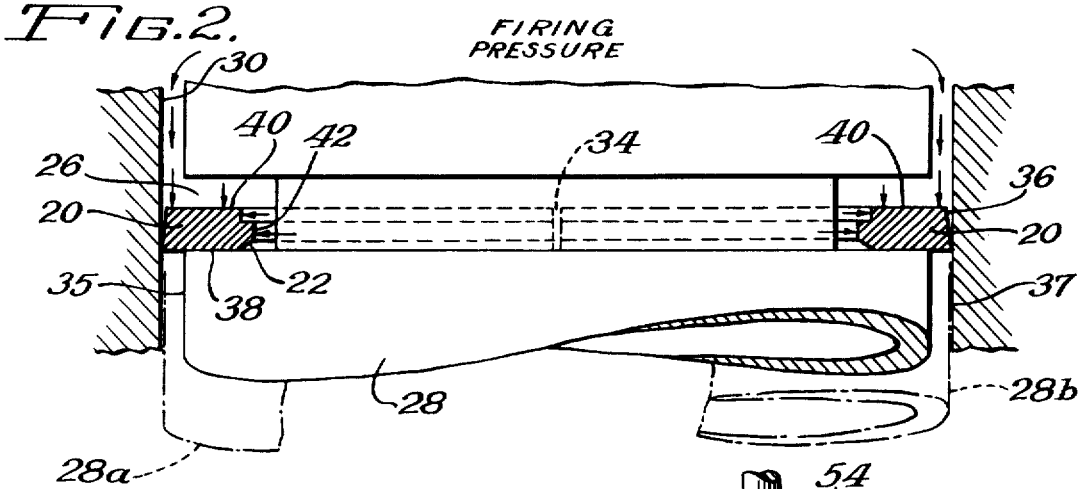
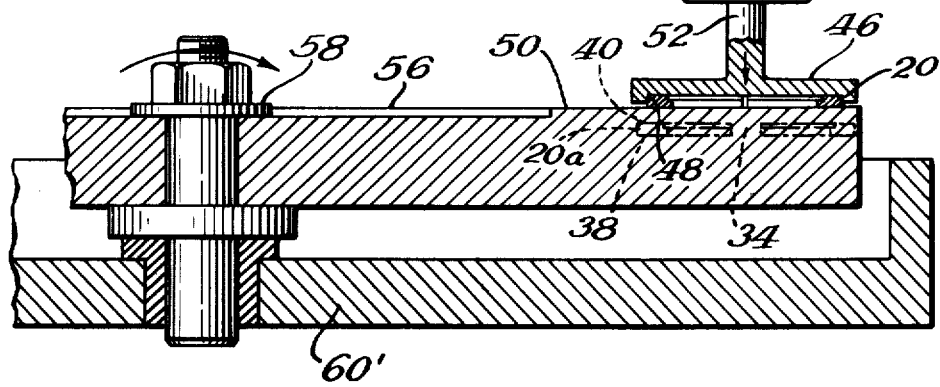

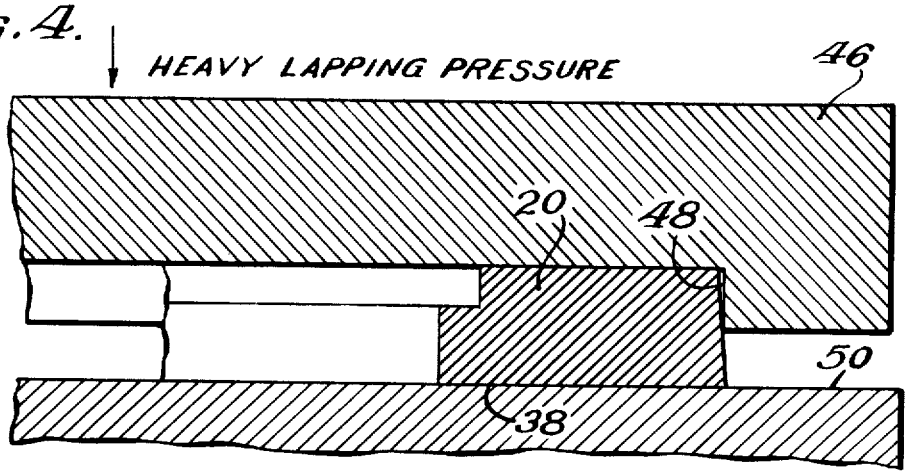
Fig. 4. ↓ HEAVY LAPPING PRESSURE
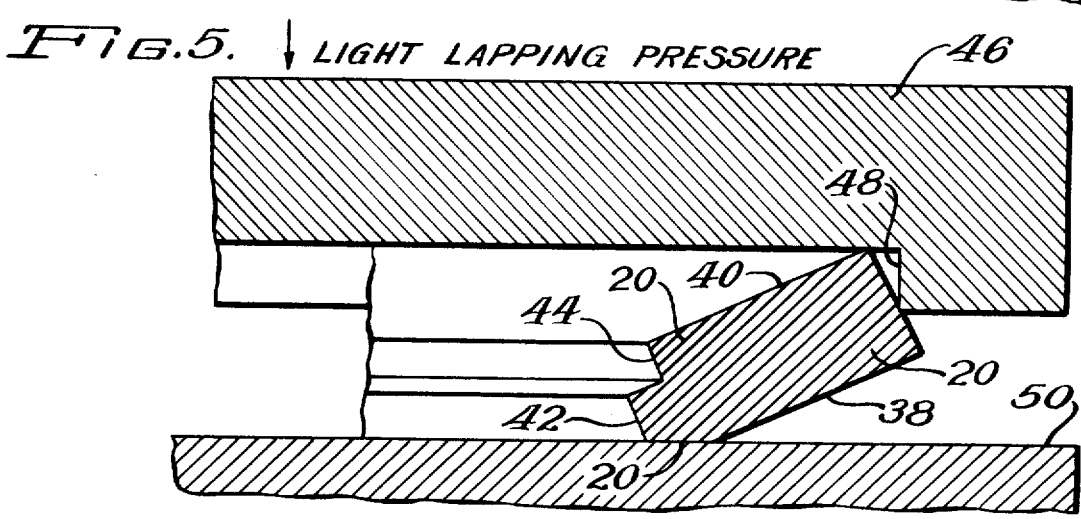
Fig. 5. ↓ LIGHT LAPPING PRESSURE
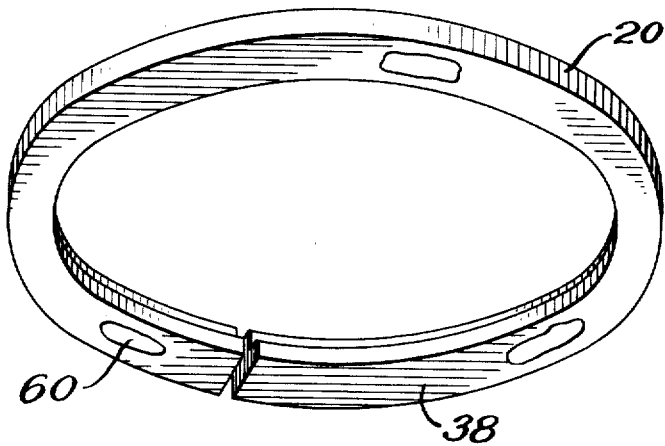
Fig. 6.

RING MANUFACTURE, PRODUCTIVE OF FACE CONTACT SEAL

This application relates to subject matter of the type generally as shown in U.S. Pat. No. 3,587,155, owned by the same assignee, and is a division of abandoned application Ser. No. 195,955 filed on or about Nov. 5, 1971, and pending application Ser. No. 382,787 filed on or about July 26, 1973.

Our inventions relate to ring manufacture productive of face contact seal. More specifically, they relate to manufacture of a piston ring, received in the compression ring groove of an I.C.E. piston and productive of substantially absolute face contact in the side seal made with the groove.

Blowby presents a problem in production piston engines. The need, as we envision it, is to control blowby so that in production we are capable both of making it predictable and of keeping it at a uniform desirably low value from engine to engine, at least in precision made productive engines which, in general, are of the multi-cylinder type.

Blowby emissions are one of the more obvious air pollutants because several of the polluting constituents thereof are clearly visible as emitted.

Blowby is one of the factors affecting lubricating oil control. Solving the blowby problem will have a material influence on reducing engine oil consumption, and we have discovered that the key to the solution is the compression rings on the pistons.

According to our inventions, the engines are sealed, i.e., each piston and its surrounding cylinder wall, are mutually sealed by an interposed piston ring either so carefully made or so lap inspected on a percentage basis that one and preferably two conditions obtain. One condition, desirable though not necessarily essential, is that the local inner peripheral edge of the ring at the groove sealing side thereof is coplanar at all points or else so localizedly lapped, in a narrow band along the inner peripheral edge at the side, that the ring will seal the confronting side of a receiving groove in a narrow, substantially continuous ring of pressure contact which amounts to line contact or, at most, is very narrow at the widest points. The resulting narrow if not line-width ring at the side of the piston ring makes up only a minor portion of the overall side. The one condition which is essential is that at least the major portion of the groove sealing side of the ring is coplanar at all points or else so lapped overall, in a wide face seal area, that the ring will seal the confronting side of the receiving groove in a circumferentially uninterrupted ring of face contact. The overall side of the ring which seals the groove side as aforesaid forms, for its major portion as viewed in cross section, a slight obtuse angle to the groove side and also to, if present, the lapped peripheral locality. Or, viewed in cross section the other way when the ring is in free spring state, the lapped peripheral locality, if any, is an internal frusto cone forming an obtuse angle with the remaining major portion of the side of the ring which is flat.

The disparity in the angularity between the mutually confronting sealed and sealing sides of the respective receiving groove and piston ring is deliberate, and under pressure during compression and firing in the engine cylinder the ring deflects into what amounts to face contact with the groove side over at least the major portion of the side of the ring, thus multiplying to substantial proportions the sealing area at the critical time. So sealing with narrow band contact or line contact, and sealing with face contact, depending upon the presence or absence of high pressure conditions, complement one another to reduce the blowby, i.e., escape of firing pressure into the crankcase by leakage in the cylinders past the pistons. The consequent better regulation of oil film thickness on the cylinder walls — known as oil control—reflects itself by the lowering of oil burning in the combustion chambers and marked reduction in the amounts of fresh oil required to be added to the engine between regular oil changes.

Our inventions thus materially reduce or substantially eliminate the problem of unpredictability and largely uncontrollably high magnitude of blowby, as will now be explained in detail. Features, objects, and advantages will either be specifically pointed out or become apparent when, for a better understanding of the inventions, reference is made to the folllowing description taken in conjuction with the accompanying drawings which show certain preferred embodiments thereof and in which:

FIG. 1 is a longitudinal elevational view of a portion of a piston and cylinder in an engine embodying one of the present ring inventions, the embodiment of FIG. 1 being shown in one of its operating positions in collapsed state;

FIG. 2 is similar, but with the embodiment of FIG. 1 shown in another operating postion in collapsed state;

FIG. 3 shows the embodiment of FIG. 1, in the operating position in collapsed state of FIG. 2, but with the environment being a lapping fixture to witness the ring for inspection purposes;

FIGS. 4 and 5 are enlarged fragmentary views corresponding to FIG. 3, showing the ring in respective major-portion lapping and remaining-locality lapping positions;

FIG. 6 is an isometric view of the ring bottom side, which is the sealing side, at outset of witnessing the major portion;

Figure 12:
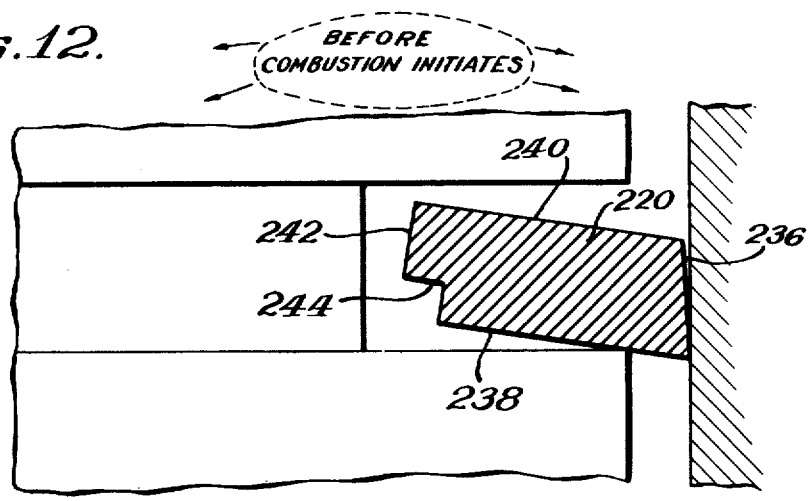
Figure 13:
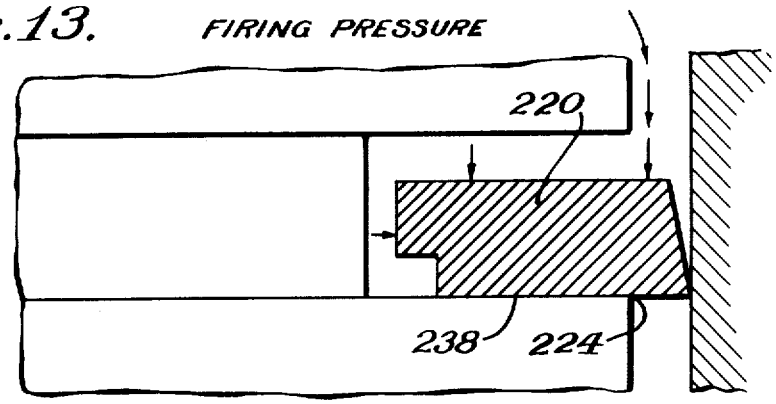
Figure 14:
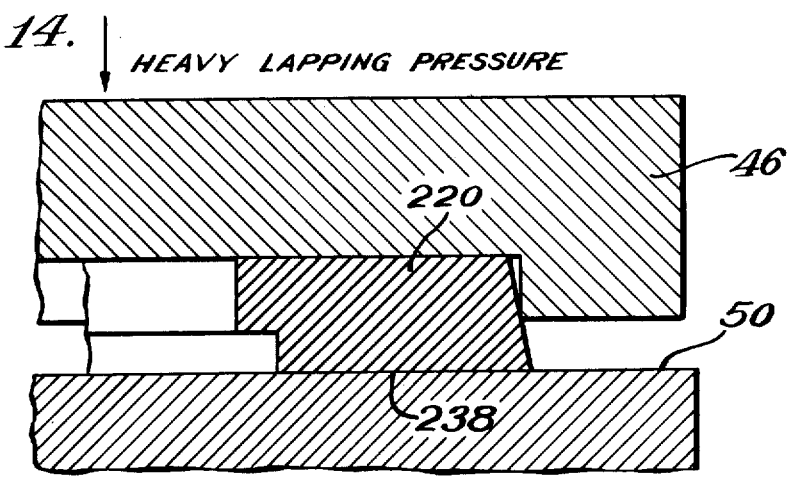

FIG. 12 is an enlarged fragmentary view similar to FIG. 1, but showing a further modification; and FIGS. 13 and 14 are enlarged fragmentary views similar to respective views 2 and 4, but showing the FIG. 12 modification of our invention.

Our inventions about to particularly described apply to, among others, rectangular positive torsion ring structure, half keystone positive torsion ring structure, and rectangular and half keystone negative torsion or reverse dish ring structure. Slightly oversimplified, a positive torsion rectangular ring is basically one which is twisted in a ring groove of rectangular cross section with the lower side of the ring bearing against the bottom of the groove at the radially inner part of the groove and inclining upwardly and outwardly therefrom. A positive torsion half keystone ring is along the same lines as above but is wedge tapered along the upper side, and the groove top side is complementarily tapered to conform with the wedge shape of the half keystone ring. Finally, the negative torsion rectangular ring twists in a rectangular groove whereby what the ring does is to have the upper side of the ring bear against the top of the ring groove in the inner part of the groove, slanting downwardly and outwardly therefrom, or else what the ring does is to have the lower side of the ring bear against the bottom of the ring groove in the outer part of the groove, inclining upwardly and inwardly therefrom, or else the ring sometimes does both.

All of the rings concerned are the so-called split rings, having a parting located at some point around the circular length of the ring. Each such ring is compressed from its normal relaxed or free state by means of a ring compressor so that it assumes a collapsed state with the parting closed or substantially so. In reaching the collapsed state, the rectangular torsion ring, for example, twists or distorts or dishes out of its normal plane in well known way dependent upon whether the curved inner face at the back of the ring has been selectively undercut at one side or the other of the ring. When collapsing, the rectangular torsion ring always takes a dished position with the undercut portion occupying what becomes the concave or internal frusto conical side of the dish.

The metal of the foregoing rings is usually alloyed cast iron or ductile cast iron, and the pistons are cast iron or an aluminum alloy. Pistons in the latter category have the compression ring grooves formed either directly in the aluminum or in hardened, grooved inserts carried by the aluminum piston.

Against this background, it is believed that FIGS. 1, 2, and 3 showing one preferred embodiment of our ring invention can be readily understood.

LOCALIZED SEATED OPERATION, COLLAPSED STATE — FIG. 1

A rectangular positive torsion ring 20 is shown in that one of its operating positions in an engine in which the ring locally seats with the frusto conical side resting on the inside diameter corner thereof, i.e., with the ring being ID seated, as that eventuality will be hereinafter referred to. When the ring is ID seated, a narrow width ring 22 of pressure contact on the ID establishes at least continuous line engagement with the inner portion of the confronting bottom 24 of a rectangular ring groove 26 in an engine piston 28. The piston reciprocates internally along the wall 30 of a cylinder of a multicylinder engine 32, being sealed to the wall by the ring 20. The ring 20 is a compression ring, and is illustrated in the tip or first ring position on the piston although the design is fully effective as the second, third, etc., compression ring on a multiringed piston.

The adjacent ends of the ring defining the parting indicated at 34 are practically touching at the operating temperature of the ring. However, in each engine the designer always takes car (providing a ring gap of 0.010 to 0.020 inch is usually an adequate safe-guard) to keep them from actually bottoming against one another because of the danger that the ring might seize in the cylinder. The ring is thus a live ring, functioning at all times as a cast iron spring preloaded so as to press outwardly against the cylinder wall.

In the collapsed operating state in the groove as shown in FIG. 1, the ring 20 has a twisted position, due to its inherent torsion, during the successive exhaust and suction strokes of the piston 28. The slight acute face angle, which the essentially cylindrical face 36 of the ring makes with the vertical, accounts for a unidirectional oil pumping action produced by the ring.

During the exhaust strokes referred to each of which is in the outward (up) direction, the ring provides good oil control, keeping an oil film on the hone pattern in the wall 30. Actually, the narrow wedge of oil being encountered by the ring exerts hydraulic face pressure, causing a slight radial inward collapse of the ring 20, and preventing it from trapping and pumping the oil upward on the cylinder wall while the ring is so moving upward. During each suction stroke, which is inward, the ring 20 due to the scraping action of the bottom corner of the face 36 thereof collects the oil in the inward (down) direction and forces it downwardly ahead of the ring. The ring does so because ther is no longer any hydraulic pressure on the ring face pushing it away from the cylinder wall. The oil cannot readily escape from the groove 26 because of contact between the ring and the top of the groove 26, and thus a bottom or face sealing side 38 of the ring pushes the oil downward.

FULLY SEATED OPERATION, CALLAPSED STATE — FIG. 2

During the successive compression and firing strokes of the piston 28, a localized sealing engagement effected by pressure contact of the seal ring always insures as a first stage of sealing that no appreciable pressure dissipation can take place by leakage past the ring 20. Hence the ring is susceptible to be flattened by the ensuing buildup of pressure. So, by a second stage of sealing, the bottom side 38 of the ring is forced into a fully seated ring area of face seal contact, i.e., with the bottom side FS seated, as that eventuality will be hereinafter referred to, against the major portion of the confronting bottom 24 of the ring groove 26. In other words, the ring reacts to the pressure by untwisting about the ID corner 22 and the inner portion of the groove bottom as a fulcrum.

The trapped pressure produces a consequent downward and outward force against the respective flat upper side 40 curved rear side 42 at the back of the ring. Hence, the curved face 36 at its lower corner is both spring loaded mechanically and pressure loaded by gas into essentially leak-free contact with the cylinder wall 30. The ring therefore leaves a residual oil film of sufficient but minimal thickness on the hone pattern in the cylinder wall for lubrication purposes; at the same time the ring scrapes off all excess oil in the inward (downward) direction, thus minimizing the amount of oil on the wall exposed to be burned during the combustion process.

Flatness is essential in the sealing side 38 if effective dynamic face sealing is to be realized. At or near top dead center, the piston 28 rocks or shifts from its broken line position 20a in FIG. 3. The antithrust side 35 of the piston is withdrawn from the side of the cylinder wall and the thrust side 37 is f orced against the opposite side of the cylinder wall as the piston takes the broken line position 28b on its downstroke in the bore. Because the ring 20 stays centered in the bore, there is appreciable sliding motion between the ring bottom side 38 and the groove bottom 24 across their interface, which must nevertheless maintain the face seal.

When the ring 20 is FS seated as a result of firing pressure holding the bottom side 38 flat against the bottom 24 of the groove, effective sealing is insured because the flatness of the major portion of the side 38 is preferably in the range of at least about ten to five light bands, at standard inspection wavelength (helium). No greater approach has been found necessary to perfect flatness of the face seal in order to achieve the practical control of blowby desired, although two light bands would, for example, improve the operation at least theoretically.

Anyway, the precise range of flatness is not the matter of basic importance here involved, but rather it is systematic analysis and insurance in all cases of good face sealing contact.

NORMAL RELAXED OR FREE SPRING STATE — FIG. 3

In the free spring state of the ring having a fully expanded diameter as shown by the broken lines 20a in FIG. 3, the adjacent ends of the ring move to their fully withdrawn position so that they are parted considerably at 34. It is when the ring is unloaded as a spring and in free state, during the ring manufacturing process, that the respective upper and lower sides 40 and 38 are made flat and parallel, and the side 38 is preferably lapped in a lapping fixture to within the range of ten to five light bands or to greater flatness, such as to two light bands flat, at standard inspection wavelength (helium). Hence, the bottom side 38 of the ring presents a fairly precise surface.

In order to make the ring 20 twist because of its cross section, the curved rear side or back 42 (FIGS. 2 and 5) is relieved by an undercut adjacent the top side 40 only, as by a chamfer or, as actually illustrated, by a rabbet or counterbore 44. So there is definite asymmetry in the cross section whereby, when the parting in the ring is close, the ring dishes into an upwardly concave collapsed form (FIG. 5).

RING CONTROL

The manufactured ring according to our objective has planarity on at least the major portion of the sealing side, when FS seated, to at least about ten to five light bands of flatness as manufactured, at standard inspection wavelength (helium).

It is now within the skill of the art, with careful control in ring manufacture over such variables as metallurgy, temperatures, manufacturing procedure, tempering, and details of ring design such as cross section and the like, to materially increase the proportion of rings in a production run above what could be expected as the happenstance or random group having face seal flatness when the ring is FS seated. (i.e., in face seal contact). So through careful control of the manufacturing process and other variables, the deliberate increasing of the proportions of such rings in the run can be realized to an expectancy of 50% and better, perhaps upwards of 90% or 95%, or possibly of 98%, which will have what can be stated as the coplanarity inherency in the face sealing side of the ring when flattened while in its collapsed state. Stated another way, at least the major portion of the sealing side of the ring in each case will, when flattened while collapsed, be uniplanar. The case is simply that, each time an improved metallurgical or manufacturing control is instituted hopefully to raise the percentage in the runs, our inventions provide a means of directly confirming or not whether there is betterment in face toward the 100% figure. Immediately being able to check out the results of each change can lead only to improved rings.

In such case, the product becomes not the happenstance or exception but the rule, and what essentially amounts to absolute area sealing, i.e., uninterrupted face contact side sealing along the full width of the interface, can be achieved with the ring.

Obviously a selection-rejection process must be used for witnessing the face sealing face at least to the extent of a spot-check inspection. Although possible, it sounds somewhat idealistic to expect to achieve rings which to a 100% extent have major portions on each of which the locus of all points will fall in one plane when the ring is FS seated. Practical manufacturing does not allow absolute predictability, and certainly the manufacture of positive torsion rings which must be mechanically distorted to install them and gas distorted to flatten them following installation does not allow absolute predictability.

Figure 8:
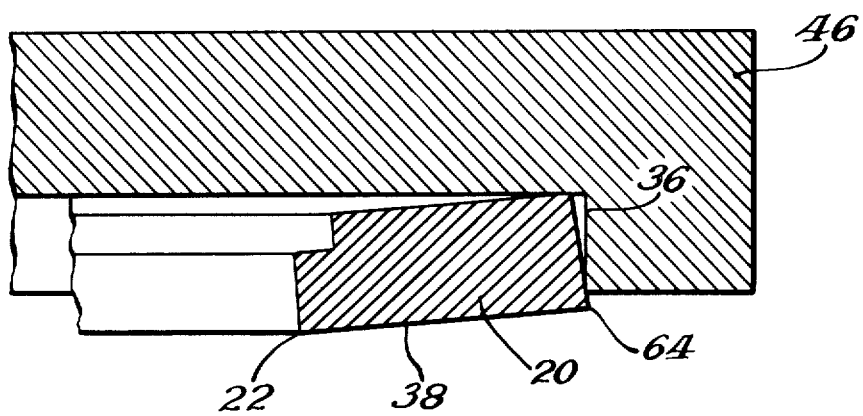
FIG. 8 is a view similar to FIG. 5, but showing a modification of our invention.
Figure 9:
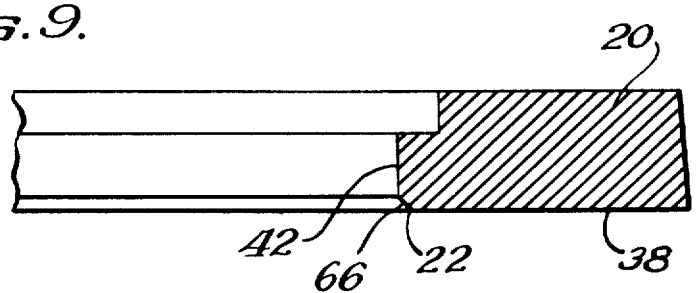
FIG. 9 is a veiw similar to FIG. 8 but showing a further modification in ring-open position.

The ring of FIGS. 4 and 8 can be viewed as such a ring having substantially absolute coplanarity along the major portion of the sealing side when mechanically and gas distorted as described, and it will be understood that the parting at 34 (FIG. 2) although greatly exaggerated corresponds to the operative parting or split or gap in the ring in collapsed state in the FS seated position.

The spot-check inspection, referred to, of such production rings is no destructive test, and a ring to be so tested is merely lapped a few test strokes to the point where the resulting uninterrupted flat face seal surface can be perceived visually. Rings which pass the test when so witnessed are perfectly usable in engines, whereas the rings so witnessed which do not pass the flatness test become rejects. Any reject having two or more high spots or two or more low spots preventing it from passing the visual inspection flatness test would, if salvage or patching were attempted, require the removal of too much metal by lapping to be acceptable thereafter. In other words, a ring is designed for certain characteristics obtainable with a particular volume of metal and removal of so much metal by lapping would lighten the ring and destroy certain characteristics preventive of the basic design objectives from being realized.

LAP APPARATUS FOR WITNESSING — FIG. 3

Prior to our discovery of the realities of the matter, there had been and never was any basis for accepting as a forgone conclusion that a positive torsion ring, flat on the bottom side in free state, would so uniformly distort into its pressure flattened collapsed state as to establish uniplanar face sealing contact with a groove side which was to be face sealed thereby and which was planar or substantially so. Further, it was never appreciated and yet, as a general rule, the usual production-made positive torsion ring when FS seated tended to be non-coplanar along the major portion of its sealing side which presented a succession of high spots and low spots, somewhat according to a wavy or undulating pattern. Hence, there existed no fundamentally orderly and systematic way whereby the engine designer or assembler could predict the amount of blowby which would be produced by each new engine as finally built, or the effectiveness of the oil control.

Novelty is felt to reside in a lapping process here provided, whereby twist-causing radial pressure on a split ring produces a torsional type distortion thereon initially, and then a flattening pressure which untwists the ring causes the final distortion necessary in order to lap and thereby witness the high spots on an otherwise flat ring side. In that connection, for witnessing on a percentage basis the actual condition during a production run of torsion rings, a chuck or fixture 46 holds the ring 20 with the sealing side 38 thereof depending and exposed by protruding in the range of about 0.010 to 0.015 inch in the ID seated state. The ring-receiving mouth 48 of the fixture has identical diameter to the cylinder bore size of the engine in which the ring 20 is to be installed.

The lap apparatus includes a raised annular confronting lap surface 50 against which the ring 20 is pressed by any suitable mechanism, such as for example, a drill press which supports the fixture 46 through a stem 52.

Appreciable downward pressure is exerted on the stem 52 by a large air cylinder 54, and rotary motion is imparted to the mechanism so as to rotate the stem 52 in the direction indicated by an arrow in FIG. 3. Such pressure and rotary motion, as a result of the friction between the ring 20 and raised lap surface 50, impart rotary motion in the direction indicated by an arrow to the table 56 supporting the surface 50. The table 56 is circular and the lapped surface 50 revolves about a spindle 58 rotatably supporting the table 56 above a fixed trough structure 60.

A full 360° lap results because of the ring rotating relative to the lap surface revolving thereunder. The lap surface 50 displays the usual undistorted mirror flatness. In some cases a table drive, not shown, can be used to advantage, particularly if uniform, positive drive motion of the table is desired about its spindle 58.

DOUBLE ANGLE LAP, FIRST STAGE — FIG. 4

With the ring in its unparted or collaped state, heavy air pressure force exerted through the fixture 46 untwists the ring 20 into FS seated state, deflected toward flat face-to-face contact with the precision lap surface. A brief lapping period ensues.

DOUBLE ANGLE LAPPING, SECOND STAGE — FIG. 5

Suitable air pressure reduction to a light air pressure force exerted through the fixture 46 enables the ring 20 to twist itself under its own torsion into ID seated state, with the protruding inner periphery 22 in contact with and the major portion of the side 38 forming a slight angle to the lap surface 50. A second stage of lapping ensures, which is again for a brief period.

REJECTION — FIG. 6

If high spots or low spots are witnessed during lapping, the ring 20 becomes a reject. Such a ring is shown in FIG. 6, whereafter the first stage of lapping discloses one or more high spots 60 on the major portion of the sealing side 38 of the ring.

As previously indicated, it is not believed economically sound and it is certainly not desirable to continue the lapping until all high spots and low spots disappear. Time will be required, coarse and fine lapping compound will be required, and as indicated certain characteristics of the ring will be altered with the weight of metal removed. The ring 20 as it appears in FIG. 6 is shown in its FS seated, collapsed state.

SELECTION — FIG. 7

The ring 20 is in free spring state as shown, and shown with its projecting inner periphery 22 presenting a lapped narrow sealing band at the corner which forms an angle of intersection with the major portion of the side 38. The band is very narrow, indicative of coplanarity of the periphery prior to lapping, and the band widens slightly at 62 adjacent the gap 34, shown open. The reason is that the gap-forming end portions of the ring 20 do not undergo maximum twist, such as, for example, does the ungapped portion of the ring 20 diametric thereto.

So for all practical purposes, the lapped inner periphery 22 is a narrow internal frusto cone which will be flat to at least about ten light bands with the ring ID seated (i.e., in contact on its inside diameter corner). The inner periphery 22 thus for all practical purposes is coplanar at all points, insuring positive first stage sealing.

The major portion of the sealing side 38 makes up the remainder not encroached upon by the lapped narrow sealing band on the periphery 22. When the ring is in the FS seated, collapsed state, the major portion of the side 38 can be said to have literal flatness, with the out-of-flatness measurable and preferably limited to a range the equivalent of no more than about 5 to 10 light bands at standard inspection wavelength (helium). So wor all practical purposes, it will be coplanar for positive face sealing under the engine pressures up to and including peak firing pressure, insuring the positive second stage sealing.

Figure 7:
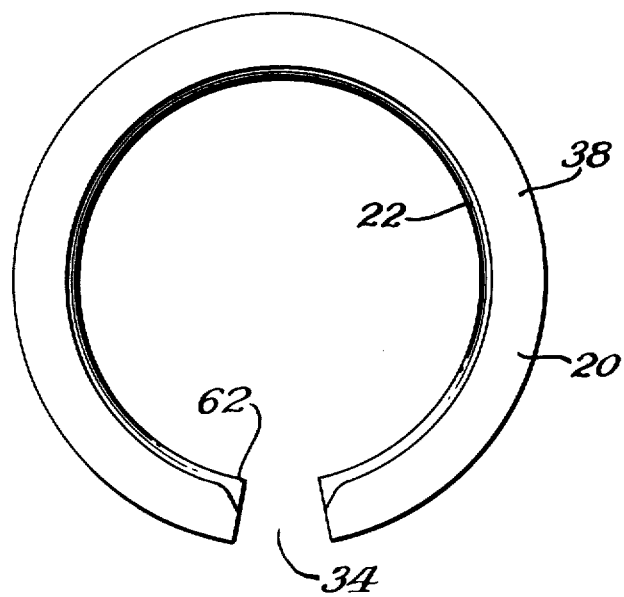
FIG. 7 is a face view of the ring bottom side, which is the sealing side, following double angle lap witnessing.

The ring shown in FIG. 7 will be a selected ring and will be used in engines with the other selected rings and with the non-inspected rings. The latter rings will obviously have a single sealing angle, unlapped, in contrast to the double angle lap surface of selected witnessed rings of this embodiment.

The stage of lapping the ring when ID seated is not always essential, and the operation can be altogether eliminated, as in the example now to be described.

SINGLE ANGLE LAP — FIG. 8

In this example, the ring 20 is selected after the sealing side 38 has been successfuly lapped and witnessed in the FS seated, collapsed state, deflected toward flat face-to-face contact with the lap surface. With release of heavy lapping pressure, the ring takes the position shown in solid lines in FIG. 8 and is removed from the fixture 46 and put into use.

The ring 20 is selected because, as witnessed, out-of-flatness in the sealing side 38 will be limited to a range of no more than about five to ten light bands (helium) when in the FS (face seal) seated, collapsed state (i.e., in face seal contact). And first stage sealing, in the ID (inside diameter) seated, collapsed state, can now be conclusively presumed.

In other words, ring control during manufacture is presently within the skill of the art to insure that, with face flatness known to exist on the face sealing side, it is a necessary attendant therewith that the inner periphery 22 thereof will have all points uniplanar when ID seated, to an equivalency of at least about light bands flatness. Therefore, two stage sealing will result with the line contact at 22 being multiplied by face contact at 38 during the second stage of sealing. The periphery indicated at 22 as viewed in cross section is essentially a knife edge.

The angles involves in the illustrated embodiments of our inventions are small and the showings have required great exaggeration in order for the angles to be manifest at all. In what amounts to the ID seated, collapsed state of the ring 20 shown in FIG. 8, the residual torsion expends itself when it twists the ring in the groove, not shown, only to the extent that the bottom corner 64 of the ring face 36 is about 0.001 inch higher than the inner peripheral edge 22 of the sealing side 38. Thus, the frusto conicity, in a ring of nominal bore size 4.3 inches for example, forms an acute angle in the range of about ½° to 3°.

Similarly, when the ring 20 is in FS seated, collapsed state, not shown, the ring face 36 is at an acute vertical angle in the range of about 1° to 3°. Thus, the angles formed with the respective bottom of the ring groove and cylinder wall, though extremely minor, are critical.

The single angle lapped (i.e., inspected by witnessing and selected) and the single angle unlapped (noninspected) rings exhibit a novel and important feature of the inventions in terms of wear-in, compared to prior rings. Inasmuch as the side sealing is right in the first instance, no run-in or wear-in is necessary as with the prior art rings, which in some cases are eventually worn in to effect proper two stage side sealing and which in other cases never wear-in to effect proper two stage side sealing.

There is another feature which is important and which it now is believed will be readily apparent. Operation of an engine equipped with the single angle rings not only does not proceed on a hit or miss basis for side sealing as with the prior art rings, but rather proceeds whereby the ring-receiving groove laps the single angle knife edge in service so as to seal in narrow band contact, and laps the seated face seal so as to retain it flat in service.

It therefore becomes apparent, it is believed, how the same two important features have further application in the respect of eliminating need for wear-in in the first instance, and in the respect of not impairing the integrity of the initially proper side sealing with wear, in service. As applied to double angle lapped rings (FIGS. 1, 2, 3, 5, 7, 10, 11), the ring-receiving groove laps the lapped seated face seal so as to retain it flat in service and laps the lapped inner local band at the ID corner so as to retain it flat in service.

Hence, freedom from blowby pollution of the air is not only insured in the first instance with a new engine, but as a continuing thing as the engine becomes worn.

BLUNTED EDGE — FIG. 9

Because of the effective knife edge formed where the inner periphery 22 intersects the backside 42 of the ring, it is preferable to uniformly blunt the ID corner with a very small chamfer or bevel 66. Otherwise, the sharpness of the ring as it twists and also moves laterally of the ring groove can do damage by cutting or gouging the metal in the groove bottom.

For simplicity, however, the chamfer 66 does not appear in most of the showings of the rings hereof.

DOUBLE ANGLE LAP, IN INVERSE STAGES — FIG. 10

Figure 10:
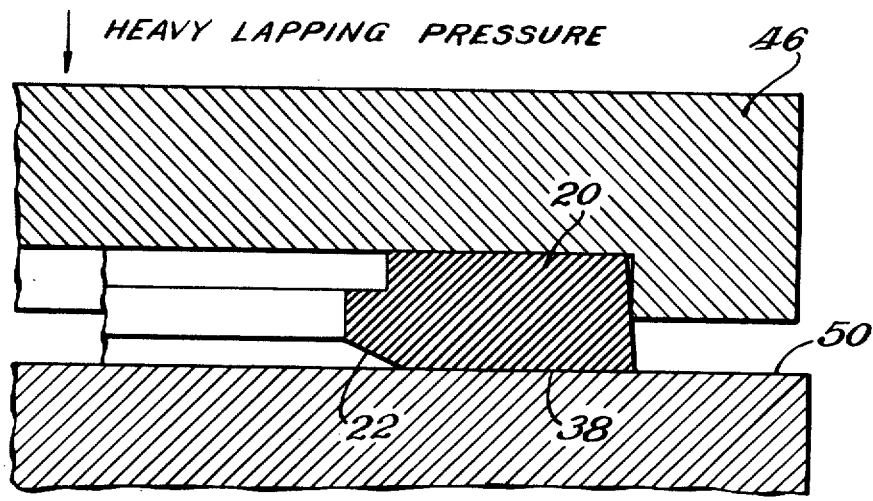
FIG. 10 is a view similar to FIG. 4, but showing another modification.
Figure 11:
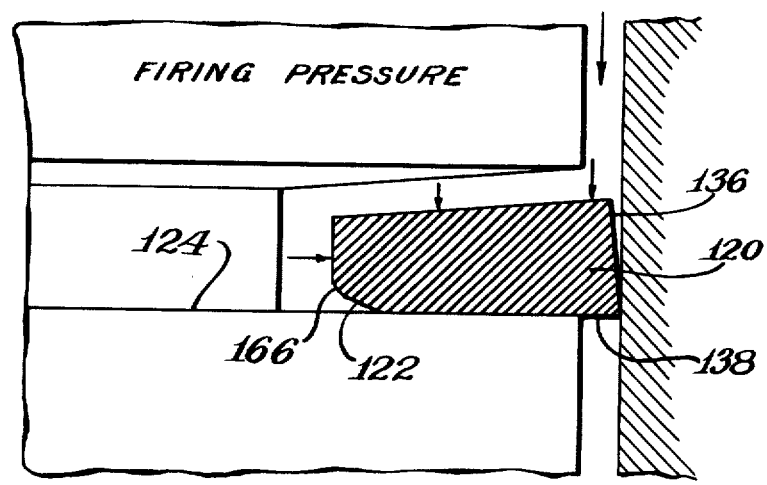
FIG. 11 is an enlarged fragmentary view corresponding to FIG. 2, but showing a further embodiment of the invention.

If the ID corner lap is desired to be included rather than eliminated, the double angle lap can be performed in an inverse order of stages from the preceding embodiment given. Thus if preferred for the results of FIG. 10, the localized lap with the inner periphery 22 under light lapping pressure can be performed first. Then as a second stage, the remaining major portion of the sealing side 38 can undergo lapping under heavy lapping pressure as illustrated in FIG. 10.

HALF KEYSTONE RING — FIG. 11

The inventions readily apply to other positive torsion rings, when made and installed as above. In this example, a half keystone ring 120 is untwisted by the gas pressure from its torsionally twisted state into the FS seated position as illustrated in solid lines in FIG. 11.

Under firing pressure when the ring is in the illustrated FS seated, collapsed state, the major portion of the sealing side 138 is flat against the groove bottom 124. The remaining lapped locality 122 is at the inner periphery, and a dulling chamfer is provided on the corner at 166.

The ring 120 has a ring face 136 disposed at an acute vertical angle and a tapered upper side 140. The complementarily tapered top of the groove is frusto conical.

NEGATIVE TORSION RING — FIGS. 12, 13

A rectangular negative torsion ring 220 according to this example has an upper side 240 and a sealing or lower side 238. In free spring state, not shown, the sides 240 and 238 are parallel horizontal upper and lower sides, similarly to the embodiments of rectangular rings previously described.

Also in similar manner, the negative torsion ring 220 has a face 236 forming an acute vertical angle for oil control purposes described, extending upwardly and inwardly. Distinctively, however, the ring 220 has a curved back 242 arranged as an inner curved side with an annular portion 244 locally removed in the down direction, not up direction as heretofore illustrated. The result is that when the parting in the ring is closed to put the ring in the ID seated, collapsed state as shown in FIG. 12, the upper and lower sides 240 and 238 incline inwardly at a small acute angle to the horizontal and in the up direction (not down direction as heretofore illustrated).

Futher distinctively, the ring 220 reacts under firing pressure by untwisting about the outer edge 224 of the groove bottom as a fulcrum. The single angle bottom side 38 in this manner takes the FS seated, collapsed state, deflected toward the flat face-to-face contact to seal against escape of the firing pressure.

SINGLE ANGLE LAP, NEGATIVE — FIG. 14

The negative torsion rings 220 are inspected on a percentage basis. A ring 220 to be selected or rejected is witnessed by a single angle lap operation, under heavy lapping pressure. If the bottom side when lapping starts is planar to at least about ten light bands of flatness, then when the ring 220 is released from the fixture 46 the bottom side 238 will show no high spots or low spots as witnessed. Such ring will belong among the selected rings whereas others which become rejects will be witnessed to be outside of the limits of flatness required.

It is not desirable and, in many cases, it is not necessary to have 100% inspection on single angle sealing sides of the rings. By 100% inspection is meant single angle lapping of every ring in a production run. It is even less desirable and in many cases unnecessary to have 100% inspection of the double angle sealing sides of the rings. By 100% inspection is meant double angle lapping of every ring in a production run. Thus, within the skill of the art the ring control will be kept careful, and so all unwitnessed rings will be used in engines and most of the witnessed rings will be used because the rejects can reasonably be expected to run few amoung witnessed rings.

At all events, the witnessed rings selected and the unwitnessed rings are used in the same way in engine manufacture, e.g., in the manufacturing process of an engine provided with a number of cylinders and with that number of pistons individual to the respective bylinders, the pistons having compression ring receiving grooves presenting groove sides associated with the ring sides and being flat or substantially so. The process comprises: selection, from a plurality of split compression rings, of rings for the grooved pistons having at least one side which, for its major portion in the free spring state of the ring, has a consistent overall smoothness, which in the torsionally twisted collapsed state with the ring closed or substantially so, has frusto conicity with the inner periphery of the side protruding and being substantially coplanar at all points on the periphery, and which when the remaining major portion of the side is compressed into flattened state while so collapsed presents a substantially uninterrupted pressure ring of face contact; sealing the pistons with such plurality of compression rings including such rings as so selected by installatioof a ring each in an associated compression ring groove on each piston with an associated side of the groove confronting the one side of the ring; and construction of the engines by assembly such pistons in the respective cylinders with each ring engaging a cylinder wall at all times to retain the ring in collapsed state on the piston, and with the ring effective during the exhaust and suction strokes of engine operation to establish a substantially continuous pressure ring of at least line contact between the protruding inner periphery of said one side and its associated confronting groove side to seal the piston, and during the compression and firing strokes of engine operation to establish a substantially continuous pressure ring of fully seated face contact at the interface of the one side and its associated confronting groove side to seal the piston.

Broadly, the basic system here involved is to change from the case hitherto of having a good seal between ring side and groove side solely as the exception of happenstance, and instead to make it the general rule that the ring side and groove side have a substantially continuous ring of face sealed contact when the ring is fully seated against the side of the groove.

Single angle lapping of the sealing side of a ring results in an uninterrupted major band which can readily be perceived visually by the inspector. If a double angle lap is used, as can be desired out of an abundance of caution, an uninterrupted narrow seal band results which can readily be perceived visually. As a practical matter, it has been found that when the narrow band exceeds 0.060 inch width at any point spaced from its ends, the ring is a proper subject for rejection. However, widening of the witness line width is permissible when noted to occur within a fraction of an inch of the gap at the ends of the ring, because the line tends to widen materially at the gap.

The heavy lapping pressure required is materially less than maximum firing pressure which will be encountered in the engine. A 100 lb. force or several 100 lbs. of force for heavy lapping will be adequate, depending upon the size of the ring to be witnessed. A fraction of 100 lbs. force has, for instance, been found inadequate in the case of a compression ring for a 4.3 inch bore engine. Specifically, a 35 lb. lapping pressure on the ring failed to flatten the sealing side against a flat lap surface.

The light lapping pressure employed is from 1 to 4 lbs., and has no appreciable effect in deflecting the ring from its frusto conical ID seated, collapsed state.

We claim

1. In a method of manufacturing a split torsion ring for engines which, when the ring is in radially collapsed state conforming to a cylinder bore size for which the ring is nominally desinged, torsionally twists as it becomes closed or substantially so, and which presents a generally frusto conical side operable as a radial face seal, the steps of:
   lap treatment of the frusto conical side of the ring upon a flat lap surface while applying pressures untwisting the ring against the surface into a distorted collapsed state, deflected toward substantially flat face-to-face contact therewith; and
   relief of said pressures, relaxing said ring whereby said side seeks its own plane, substantially flattened out while in free spring state.

2. In a method of manufacturing a split torsion piston ring for engines which, when the ring is in radially collapsed state conforming to a cylinder bore size for which the ring is nominally designed, torsionally twists as it becomes closed or substantially so, and which presents a generally frusto conical side operable as a radial face seal, the steps of:
   distortion of the ring by pressure radialwise into a state of simulation simulating its torsionally twisted collapsed state in the engine;
   lap treatment of the frusto conical side of the ring against a confronting flat lap surface attended with lap pressure application untwisting the ring into further distorted state, deflecting said side toward flat face-to-face contact against said surface; and
   relief of said radial and lap pressures, relaxing said ring whereby the side seeks its own plane, substantially flattened out while in free state.

3. Method of providing a piston ring in production engines which, at least when the ring is in a collapsed state conforming to a cylinder bore size for which the ring is nominally designed, becomes closed or substantially so, and which presents at least one side of the ring which is generally frusto conical, comprising the steps of:
   compression of the ring radialwise into its collapsed state;
   juxtaposition under light lap pressure of a confronting lap surface of a shape and attitude causing localized lapping whereby the ID corner only of said side of the ring projects into local contact with the confronting lap surface, so that said side forms at all times a slight angle to said surface;
   juxtaposition under heavy lap pressure of the confronting lap surface causing lapping of the remaining major portion of the side in a state tending to be flattened against said surface while so collapsed.

production of relative motion between the ring and confronting lap surface under the separate heavy and light lap pressures respectively, providing the side with a substantially uninterrupted lapped pressure ring of flat face contact on the remaining major portion thereof, and providing the side with a substantially continuous lapped narrow seal band which is at said locally contacting ID corner and which forms in angle of intersection with the remaining major portion of the side; and introduction of said ring in an engine in collapsed state between the cylinder wall and a piston, arranged in a piston ring groove with the cylinder wall engaging the ring to retain the latter at all times in collapsed state on the piston, and with the ring effective during engine operation to establish substantially continuous rings of pressure contact at the interface of said side of the ring and the side of the groove at that side.

4. The invention of claim 3, characterized by the introduced ring being arranged in a rectangular piston ring groove;

the operation of the ring in collapsed state in said engine characterized by twisting the ring in the rectangular groove with torsion during engine suction and exhaust thus tending to render said side of the ring frusto conical, and untwisting the ring in the rectangular groove with gas pressure during compression and engine firing thus tending to flatten the remaining major portion of the side into a pressure ring of face contact lapped as described.

5. The invention of claim 3, characterized by the confronting lap surface being flat, the relative motion being movement in the plane of the ring.

* * * * *